June 2, 1925.  
O. T. WAITE  
1,540,046  
RUG AND STRAND THEREFOR  
Filed May 31, 1923

Inventor.  
Ossian T. Waite.  
By Banning & Banning  
Attorneys

Patented June 2, 1925.

1,540,046

UNITED STATES PATENT OFFICE.

OSSIAN T. WAITE, OF OSHKOSH, WISCONSIN, ASSIGNOR TO WAITE GRASS CARPET COMPANY, OF OSHKOSH, WISCONSIN, A CORPORATION OF WISCONSIN.

RUG AND STRAND THEREFOR.

Application filed May 31, 1923. Serial No. 642,420.

*To all whom it may concern:*

Be it known that I, OSSIAN T. WAITE, a citizen of the United States, residing at Oshkosh, in the county of Winnebago and State of Wisconsin, have invented certain new and useful Improvements in Rugs and Strands Therefor, of which the following is a specification.

The present invention relates primarily to a rug and rug strand designed to combine the stiffness and body afforded by a core of wire grass (*Calex stricta*), which is now commonly used in the making of grass rugs, with the surface texture of a fabric rug.

The use of wire grass in the rug industry has proved of great value and importance on account of the cheap character of the raw material, but rugs composed entirely of such grass are open to certain objections which have in a large measure restricted their use to porches, summer cottages, or structures of a rustic character. The chief objection to the use of this material is due to its relatively brittle character which renders a fraying or breaking of the surface texture of the rug inevitable if subjected to severe abrasive action, so that grass rugs are usually short lived.

Another objection resides in the fact that the surface texture of such a rug is harsh and uncomfortable to the bare feet, and will occasionally splinter after moderate usage.

Another objection resides in the fact that in making a strand solely from grass of this character it is necessary to discard the short lengths which cannot be successfully spun into a strand of sufficient tensile strength to be woven on a loom, so that a large portion of the natural grass crop must be discarded for rug making purposes.

The present invention is designed to overcome the objections noted, by providing a surface covering of thin pliable woven fabric which is bound around a core or bundle of overlapping grass wisps or stalks, thereby serving to unite the same into a close compact strand which may be easily woven in a loom without danger of breakage. Furthermore, by the use of such covering or sheath of fabric the short lengths of grass may be successfully employed, thereby reducing the wastage of grass for rug making purposes.

A further advantage resides in the fact that the fabric sheath affords a closely woven surface texture for the strand and for the rug surface, so that it is much better fitted to withstand surface wear or abrasive action, while at the same time the stiffness, flexibility and body of the grass core prevents a matting down or compacting of the rug in the manner frequently observed in rag rugs or the like which are formed exclusively from strips of fabric. In short, by combining the grass core and the fabric sheath, a firm, thick-bodied, relatively stiff and even rug is provided, which will lie flat on a floor and will maintain itself against surface wear or compacting effect for a long period of time, and will at the same time afford a thick, soft, yielding and resilient surface so desirable in a floor covering. Furthermore, the use of the fabric sheath permits the employment of an indefinite number of color designs, which cannot be secured by the use of an uncovered grass strand.

Figure 1:
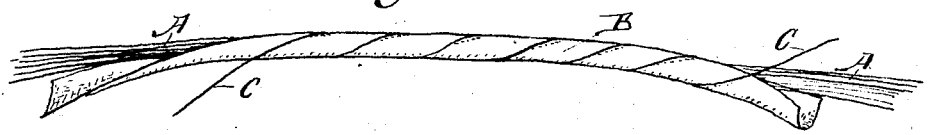
Figure 1 is a short strand, with the ends opened up to better illustrate the construction.
Figure 2:
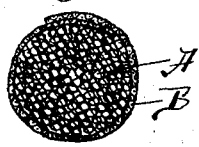
Fig. 2 is an enlarged cross sectional view of the same.
Figure 3:
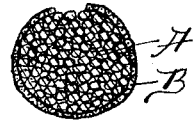
Fig. 3 is a cross section of a slightly modified construction.

The strand consists of a core A in the form of a bundle of straight laid overlapping lengths of grass, preferably the straight lengths of wire grass, which possesses stiffness, flexibility and resistance to compacting action. Around the core is wrapped a sheath B of thin pliable woven fabric, the edges of which are preferably overlapped, as in Fig. 2, to completely conceal and protect the grass core, although if desired the edges may be spaced as in Fig. 3, to expose a portion of the grass where such exposure is desired for the purpose of giving a variegated appearance to the surface of the rug. The sheath is held in place around the core by the provision of a spiral wrapping cord or twine C.

Figure 4:
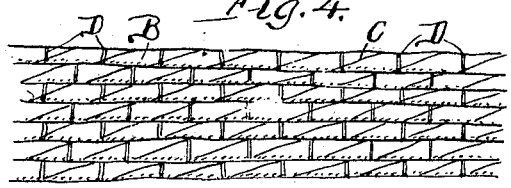
Fig. 4 is a section of a rug formed of the strand of Fig. 1.

Fig. 4 illustrates a rug formed of strands of the above character, which constitute the woof of the rug, in combination with a warp D of cotton twine or the like commonly employed in the weaving of grass rugs.

From the above description it will be apparent that by employing a fabric sheath an unlimited range of colors may be secured in the completed rug, since the sheath or covering material may be had in any desired color or combination of colors. Moreover, the fabric sheath affords a soft surface texture which, by reason of the resilient backing provided by the core, will be extremely resistant to surface abrasion, and at the same time any breaking or cracking of the individual wisps of grass will have no disintegrating effect on the rug, since the same will be protected against protrusion by the closely woven sheath.

The rug of the present invention, by reason of its surface texture and appearance, is admirably adapted for general house use, or use in bath rooms or bed rooms, where ordinary grass rugs would be ill adapted for use.

I claim:

1. A strand for use in rug making, comprising a core consisting of a bundle of relatively stiff fibrous material in overlapping relation, a sheath of closely woven fabric, and a binding cord wrapped around the sheath to hold the same firmly around the core, substantially as described.

2. A strand for use in rug making, comprising a relatively bulky core consisting of overlapping lengths of relatively stiff wire grass, a sheath surrounding the core and consisting of relatively thin closely woven fabric, and a binding cord surrounding the sheath and holding the same closely around the core, substantially as described.

3. A strand for use in rug making, comprising a core consisting of a bundle of overlapping lengths of stiff wire grass, a sheath surrounding the core and consisting of relatively thin soft fabric, and a spirally wound wrapping cord surrounding the sheath, substantially as described.

OSSIAN T. WAITE.